United States Patent
Kretschmer

Patent Number: 5,388,366
Date of Patent: Feb. 14, 1995

[54] FISH HOOK LURE AND METHOD OF MAKING SAME

[76] Inventor: Gary L. Kretschmer, Rte. 2 Box 299AA, Fall Creek, Wis. 54742

[21] Appl. No.: 187,379

[22] Filed: Jan. 27, 1994

Related U.S. Application Data

[63] Continuation of Ser. No. 40,843, Mar. 31, 1993, abandoned.

[51] Int. Cl.$^6$ .............................................. A01K 83/00
[52] U.S. Cl. ..................................... 43/43.16; 43/42.32
[58] Field of Search ................ 43/43.16, 44.82, 42.32, 43/42.34, 42.53

[56] References Cited

U.S. PATENT DOCUMENTS

| | | | |
|---|---|---|---|
| D. 324,407 | 3/1992 | Snyder | D22/126 |
| D. 326,891 | 6/1992 | Hill et al. | D22/126 |
| 895,493 | 8/1908 | O'Brien | 43/44.83 |
| 1,601,292 | 9/1926 | Burns | 43/44.83 |
| 2,188,753 | 1/1940 | Jennings | 43/42.32 |
| 2,511,117 | 6/1950 | Loeb | 43/42.37 |
| 2,754,612 | 7/1956 | Means | 43/42.32 |
| 2,775,055 | 12/1956 | Waugh | 43/42.25 |
| 2,799,963 | 7/1957 | Noer | 43/42.32 |
| 2,861,383 | 11/1958 | Gray | 43/53.5 |
| 2,990,641 | 7/1961 | Weidman | 43/43.16 |
| 3,638,347 | 2/1972 | Kochevar | 43/42.39 |
| 3,768,195 | 10/1973 | Proietti | 43/42.33 |
| 3,855,721 | 12/1974 | Strader | 43/42.32 |
| 3,877,168 | 4/1975 | Stevens | 43/42.34 |
| 3,918,192 | 11/1975 | Rabideau | 43/42.17 |
| 3,947,989 | 4/1976 | Bart | 43/42.33 |
| 4,715,142 | 12/1987 | Richard | 43/43.16 |
| 4,835,899 | 6/1989 | Helton | 43/42.53 |
| 5,084,998 | 2/1992 | Dixon | 43/43.16 |
| 5,097,622 | 3/1992 | James | 43/43.16 |
| 5,146,707 | 9/1992 | Nichols | 43/42.33 |

FOREIGN PATENT DOCUMENTS 1200511 7/1970 United Kingdom ............... 43/43.16

*Primary Examiner*—P. Austin Bradley
*Assistant Examiner*—Chuck Y. Mah
*Attorney, Agent, or Firm*—Jacobson & Johnson

[57] ABSTRACT

The invention comprises a hook provided with a shank carrying an eye for attaching a line thereto and further carrying a bend, with a pointed end for hooking a fish with the fish hook having substantially a constant diameter and an outer surface for reflective light of a first wavelength with the improvement including a first layer of decorative material having a first pigment located on a first region of the fish hook, with the first layer of decorative material conforming to the outer surface of the fish hook without adding bulk to the hook, the first layer of decorative material reflects light of a wavelength different from the reflected fight of the outer surface of the point of the hook to provide the hook with greater visual attractiveness than the point of the hook and a method of making a fish-hook lure from a fish hook having an outer surface of substantially uniform dimension including the steps of spraying a layer of a first decorative material having a first pigment along a first portion of the fish hook and spraying a second layer of a second decorative material having a second pigment different from the first decorative material over a second portion of the hook so that the fish-hook lure has at least two layers of different and contrasting layers of pigment adjacent to one another to provide a hook of enhanced visual perception.

15 Claims, 2 Drawing Sheets

FISH HOOK LURE AND METHOD OF MAKING SAME

This application is a continuation of application Ser. No. 08/040,843, filed Mar. 31, 1993, now abandoned.

FIELD OF THE INVENTION

This invention relates generally to lures and, more specifically, to a fish-hook lure free of external body-enlarging materials other than layers of different light-reflecting materials which allows a fish hook to function as a lure, yet allows the fish hook to retain its characteristic hook shape.

BACKGROUND OF THE INVENTION

The concept of lures including flies and jigs is well known in the fishing art. The present invention provides an improvement to the fish hooks used with such lures by providing selected regions of different light-reflecting materials on a portion of the hook so that the hook functions as a lure yet retains its characteristic appearance of a fish hook.

A particular advantage of the present fish hook lure is that, even though it makes the hook more visible, it also makes the hook attractive to fish. In addition, the coating on the hook inhibits and prevents rusting of the hook. It has also been found that the texture of the paint on the hook eye holds the knots more securely than a bare hook eye, thus lessening the chances of the line pulling free of the hook. A user advantage is that the hook is more visually perceptible to the user making it easier to attach to a line or locate it if the hook should be accidentally dropped. Additionally, but not distracting from the basic function of the fish hook, it permits an angler to use live baits in conjunction with the hook to provide a visual fish-attracting hook to compliment a visual attractiveness of the live bait.

DESCRIPTION OF THE PRIOR ART

Figure 1:
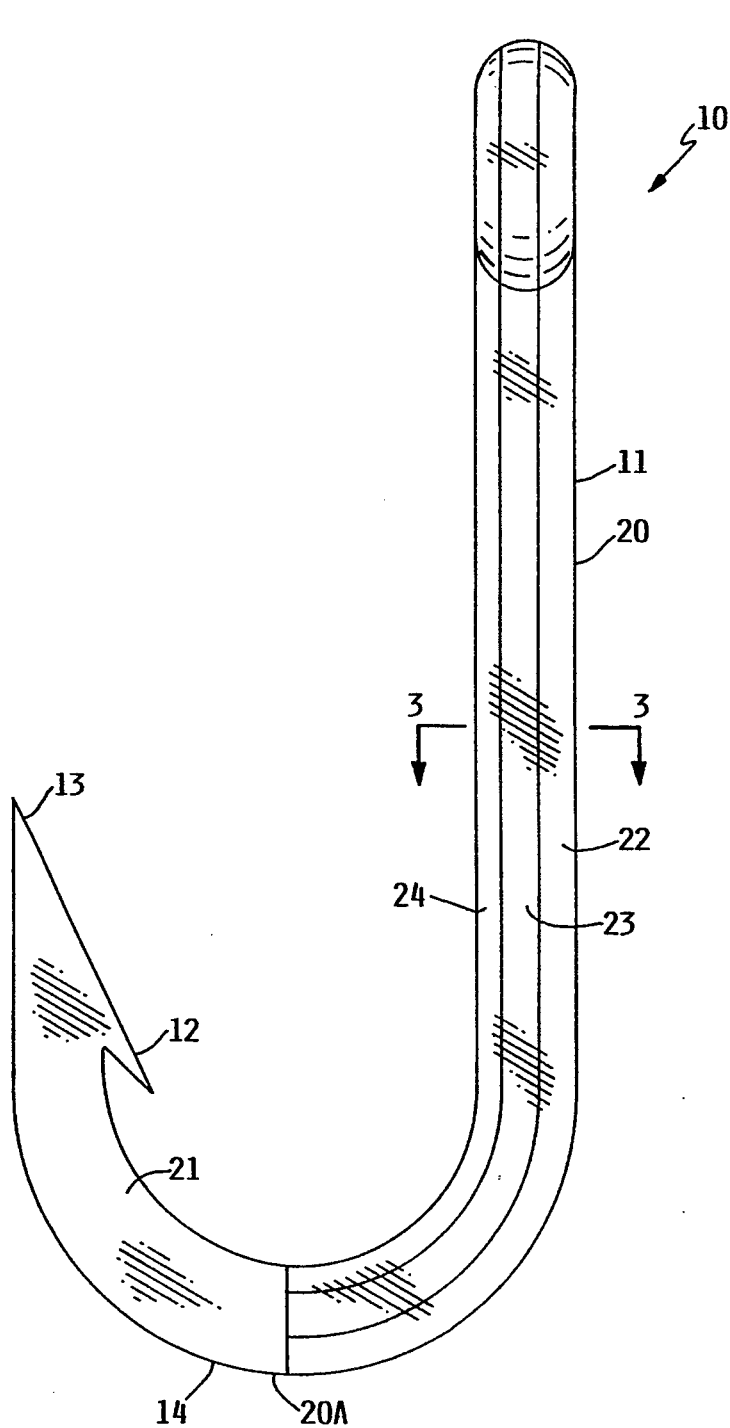
FIG. 1 is a side view of the fish-hook lure of the present invention.

U.S. Pat. No. 2,511,117 shows a wet-or-dry fly with an enlarged plastic body of translucent material on the shank of the hook.

U.S. Pat. No. 2,861,383 shows slidable beads located on the shank of the hook to enable one to disgorge the hook from a fish.

U.S. Pat. No. 2,775,055 shows a method of covering a shank with a flock of different colors by applying adhesives to the shank of the hook and then inserting the hook into a flocking chamber.

U.S. Pat. No. 2,990,641 shows a sleeve on the shank of a fish hook which can be slid down to withdraw the hook from a fish.

U.S. Pat. No. 5,084,998 shows a fish hook having a coating of Teflon or the like in order for the hook to have less resistance in penetrating the mouth of the fish.

U.S. Pat. No. 3,768,195 shows a colored sleeve extending along the shank and over a portion of a swivel.

U.S. Design Pat. No. 324,407 shows a fishing jig with a head extending over the eye of the hook.

U.S. Design Pat. No. 326,891 shows a fishing jig with a body member extending over a portion of the shank with the body member having eyes to appear as an insect or the like.

U.S. Pat. No. 895,493 shows a fish hook with an open eye for attaching a line thereto.

U.S. Pat. No. 1,601,292 shows a further embodiment of a fishing hook which can be attached to a line without attaching a knot thereto.

U.S. Pat. No. 3,638,347 shows a sinker comprised of a manually movable material which is attached to a fishing line proximate a hook.

U.S. Pat. No. 4,715,142 shows a self-destruct fishing hook having an exposed area of steel which corrodes rapidly so that the hook self destructs if the line should break and the hook remains in the fish.

U.S. Pat. No. 5,097,622 shows a novel fish hook having a sleeve proximate the area of reduced diameter with the sleeve being of a flexible material and secured to the shank for setting of the fish hook.

BRIEF SUMMARY OF THE INVENTION

Briefly, the invention comprises a hook provided with a shank carrying an eye for attaching a line thereto and further carrying a bend, with a pointed end for hooking a fish with the fish hook having substantially a constant diameter and an outer surface for reflecting light of a first wavelength with the improvement including a first layer of decorative material having a first pigment located on a first region of the fish hook, with the first layer of decorative material conforming to outer surface of the fish hook without adding bulk to the hook. The first layer of decorative material reflects light of a wavelength different from the reflected light of the outer surface of the point of the hook to provide the hook with greater visual attractiveness than the point of the hook. The method of making a fish-hook lure from a fish hook having an outer surface of substantially uniform dimension includes the steps of spraying a layer of a first decorative material having a first pigment along a first portion of the fish hook and then spraying a second layer of a second decorative material having a second pigment different from the pigment of the first decorative material over a second portion of the hook so that the fish-hook lure has at least two layers of different and contrasting layers of pigment adjacent to one another to provide a hook of enhanced visual perception.

DESCRIPTION OF THE PREFERRED EMBODIMENT

Referring to the drawings, FIG. 1 shows a side view of the fish-hook lure 10 of the present invention. Typically, fish hook lure 10 comprises a one-piece fish hook made of metal such as steel or bronze having multiple layers of different light-reflecting materials thereon. Fish hook lure 10 is characterized by being free of shank-enhancing members which would provide bulk to the shank of the hook.

Figure 2:
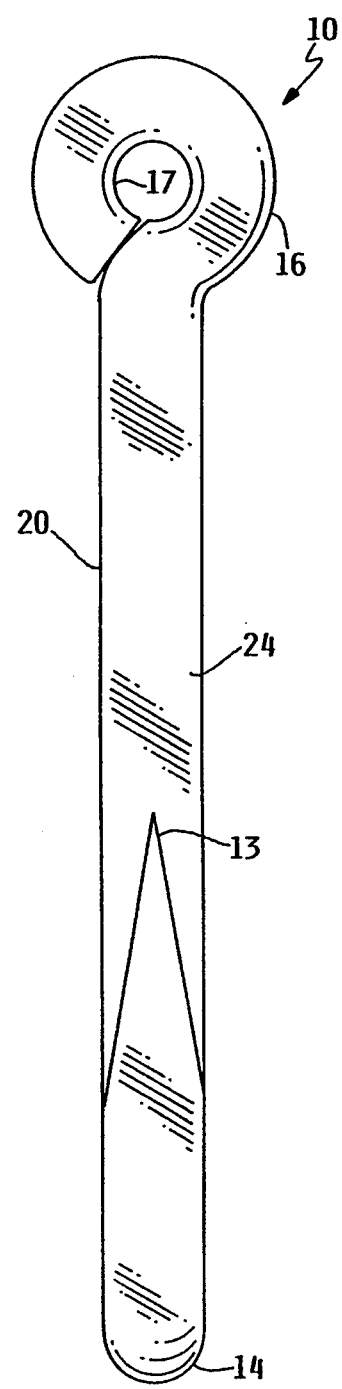
FIG. 2 is a front view of the fish-hook lure of FIG. 1.

FIG. 2 shows a front view of the fish-hook lure of FIG. 1. Fish hook lure 10 comprises a shank portion 20 free of any hackles or body portions which are normally added to the shank of a hook to form the hook into a jig or the like. Fish-hook lure 10 substantially retains its fish hook shape and has an eye 16 with an opening 17 for attaching a fishing line thereto. Located on the opposite end of shank 20 is a bend or curved portion 20a which connects shank 20 to barb 12 having a point 13. The fish hook has substantially a constant diameter and an outer surface which reflects light of a first wavelength with the layer of decorative material applied to the outer surface of the shank for the purpose of enhancing the visual appearance of the shank of the hook by reflecting light of different wavelengths, yet not substantially increasing the bulk of the shank.

Figure 3:
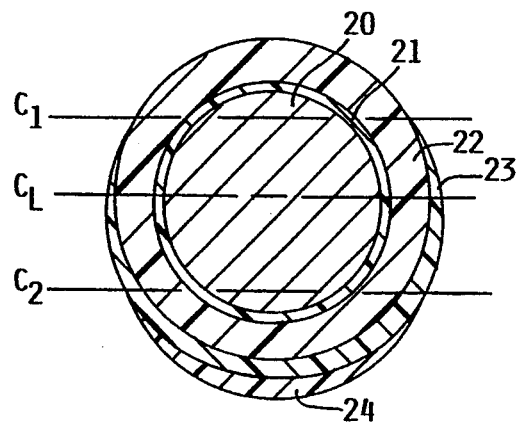
FIG. 3 is a cross-sectional view taken along line 3—3 of FIG. 1.

FIG. 3 shows a cross-sectional view taken along lines 3—3 of FIG. 1. Cylindrical shank 20 is shown in cross section with multiple layers of decorative material located thereon. For illustrative purposes, the layers of material are shown in an enlarged condition. Encapsulating shank 20 and preferably the entire fish-hook lure 10 is a layer of material such as a primer or transparent, rust-inhibiting epoxy resin paint 21. The purpose of the primer is to prevent exposed portions of the hook from rusting and also to form a base for receiving layers of decorative material. Extending completely around a first portion of shank 20 and primer layer 21 is a first base layer of material 22 which can be transparent or reflect light of a first wavelength. Extending over and partially obscuring the first base layer of material 22 is a first layer of a decorative material 23 which reflects light of a second wavelength which is reflectively different from the first layer of reflective material to thereby provide a visual contrast between regions 22 and 23. Extending over and partially obscuring the second layer of decorative material 23 is a third layer of decorative material 24. Similarly, the layer of decorative material 24 reflects light of a wavelength which is different from the wavelength of the third layer of decorative material 23 to provide a visual contrast between regions 23 and 24 on shank 20.

Referring to FIG. 1, the effect and position of the multiple layers of decorative material can be appreciated. Each of the decorative layers 22, 23 and 24 extend longitudinally and axially from hook eye 16 through shank 20 and partially onto bend 20a of hook 10. The result is a front view which has a first unitary decorative appearance (FIG. 2) and a side view with a multiple, banded decorative appearance.

Figure 4:
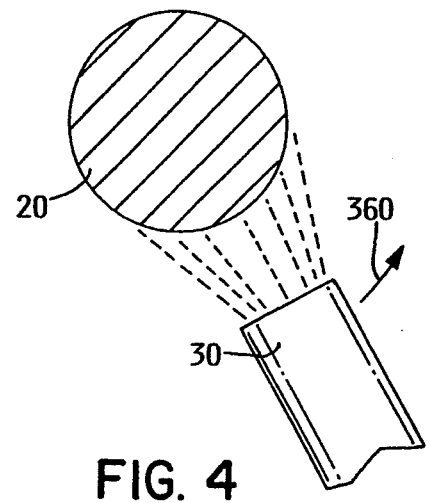
FIG. 4 shows a portion of a fish-hook lure being sprayed with a protective coating.
Figure 5:
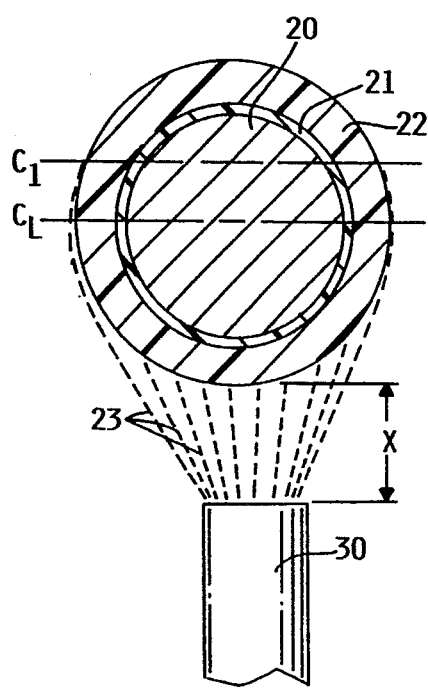
FIG. 5 shows a portion of fish hook of FIG. 4 being sprayed with a further coating.
Figure 6:
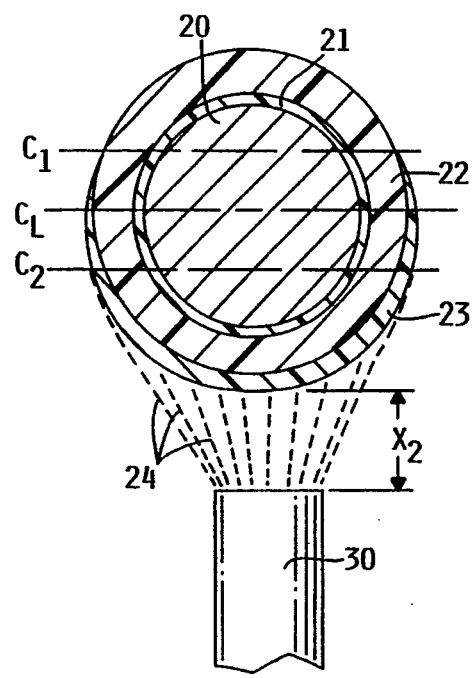
FIG. 6 shows a further coating being sprayed on top of the coating sprayed in FIG. 5.

Referring to FIGS. 4 through 6, the method of applying the layers of decorative material to the fish hook of the present invention will be described in further detail.

FIG. 4 shows a metal fish-hook shank 20 with a nozzle 30 air brushing or spraying a first layer of primer material in a 360-degree circle around shank 20 and hook 10. The movement of nozzle 30 provides a uniform protective layer of primer coating 21 encapsulating shank 20, as shown in FIG. 5. After the first coating of transparent material or primer 21 is applied to the hook, a second layer of translucent or decorative material 22 is applied in a similar manner completely around shank 20. FIG. 1 shows decorative layer 22 extends from bend 20a and over eye 16.

FIG. 5 illustrates the next step in the process of spraying a third layer of decorative material 23 along the front side of shank 20. As can be seen in the drawing, the decorative material 23 extends around the centerline $C_L$ and is deposited on the shank up to the line $C_1$ which is substantially parallel to centerline $C_L$. Thereafter, the decorative material feathers out since it does not readily wrap around the back side of cylindrical shank 20. By maintaining the nozzle in a fixed position on one side of the shank and controlling the nozzle spacing from the hook as well as the width of the nozzle, one can cover a longitudinal region of hook 10 with a layer of decorative material 23. By spraying the layers of decorative material thereon, one forms feathered regions at the edge of the decorative layers which provide a contrasting appearance. In addition, the thickness of the decorative layers on the hook is kept to only a few mils, thereby not creating bulk on the shank of the hook.

Referring to FIG. 6, a further layer of decorative material 24 is being sprayed onto the front portion of shank 20 with the further layer 24 extending only partially around shank 20 to a line $C_2$ which is parallel to centerline $C_L$, thereby leaving a region between lines $C_1$ and $C_2$ which is covered by decorative layer 22. That is, by bringing spray nozzle 30 closer to the shank 20, one can control how far the layer of decorative material 24 wraps around the shank 20.

In the steps shown in FIGS. 5 and 6, the nozzle may be moved axially up or down during the application stage, but the nozzle is not permitted to move circumferentially around shank 20.

FIGS. 1 and 3 show the present embodiment of the hook with an elongated front band of decorative material 24 which extends from eye 16 to bend 20a. Visible from both sides of hook 10 is the layer of decorative material 23 and located on the backside is base decorative layer 21. The decorative materials can be epoxy paints or other suitable light-reflecting materials.

While various layers of decorative materials can be used, typical layers of adjacent decorative materials should contain contrasting pigments such as red, orange, pink, chartreuse, green or yellow pigments. In order to provide even higher contrast, decorative layers containing fluorescent materials are preferred.

The layers of decorative material have a thickness of only a few mils so that, even after application of the multiple layers of different decorative materials, the fish hook visually still appears as a fish hook. That is, spraying material onto the hook allows each layer to have a thickness of less than 5 mils yet have the visual appearance of a normal hook.

In the preferred embodiment I have found that two part epoxy resin paints are suitable for both the primer and the outer decorative layers since they adhere tenaciously to the hook and when dry have a thickness of less than 5 mils. Although epoxy resin paints are preferred other paints having suitable adhesion and pigment colorant could be used.

I claim:

1. A painted fish-hook lure ready to use without adding bulky materials to the fish hook lure comprising a hook having a shape provided with a shank carrying an eye for attaching a line thereto and further carrying a bend with a pointed end for hooking a fish with the fish hook having an outer surface for reflecting light of a first wavelength with the improvement comprising:

an outer thin coating of a single decorative paint material secured on a first surface region of the fish hook, said outer thin coating of decorative paint material conforming to and covering the first surface region of the fish hook from the eye of the hook to the bend of the hook without adding bulk to the hook, said outer coating of decorative paint material having an outer surface substantially uniformly spaced from the outer surface of the hook, said outer thin coating of decorative paint material sufficiently thin to maintain the shape of the fish hook and prevent visual obscuring the shape of the fish hook, said outer thin coating of decorative paint material reflecting light of a wavelength different from the reflected light of the outer surface of the pointed end of the fish hook to provide the shank of the hook with greater visual attractiveness than the point of the hook.

2. The painted fish-hook lure of claim 1 including a clear primer layer extending completely around said hook and encapsulating said hook.

3. The fish hook of claim 1 wherein the thickness of the outer thin coating is less than 5 mils.

4. A painted fish-hook lure comprising a hook having a shape provided with a shank carrying an eye for attaching a line thereto and further carrying a bend with a pointed end for hooking a fish with the fish hook having substantially a constant diameter and an outer surface for reflecting light of a first wavelength with the improvement comprising:

a first coating of a decorative paint material located on a first region of the fish hook, said first coating of decorative paint material conforming to outer surface of the fish hook without adding bulk to the hook, said first coating of decorative paint material maintaining the shape of the fish hook, said first coating of decorative paint material reflecting light of a wavelength different from the reflected light of the outer surface of the pointed end of the fish hook to provide the shank of the hook with greater visual attractiveness than the point of the hook; and a second coating of decorative paint material extending over and obscuring a portion of said first coating of decorative paint material, said second layer of decorative paint material reflecting light of a second wavelength with said second wavelength different from said first wavelength so that the fish-hook lure visually appears with at least two decorative coatings visible on said hook.

5. The painted fish-hook lure of claim 4 including a primer coating comprising an epoxy resin primer layer extending around and encapsulating the entire hook.

6. The painted fish-hook lure of claim 4 wherein the first layer of decorative paint material extends lengthwise along said hook.

7. The painted fish-hook lure of claim 4 wherein the second layer of decorative paint material extends lengthwise along said hook.

8. The painted fish-hook lure of claim 4 including a third layer of decorative material reflecting light of a third wavelength with said third wavelength different from said second wavelength, said third layer of decorative paint material extending over and covering a portion of said second layer of material so that said hook reflects at least three different wavelengths.

9. The painted fish-hook lure of claim 8 wherein said fish hook is made of steel and said first layer of material and said second layer of paint material are pigment-containing paints.

10. The painted fish-hook lure of claim 4 wherein the fish-hook shank is free of any hackles.

11. The painted fish-hook lure of claim 4 wherein said shank portion of said fish hook is free of any shank-enlarging members.

12. The method of making a painted fish-hook lure from a fish hook having an outer surface of substantially uniform dimensions by selectively painting portions of the fish hook comprising the steps of:

spraying a coating of a first decorative paint material along a first portion of the fish hook;

maintaining a paint spray nozzle in a fixed position on one side of the fish hook while feathering a second coating of a second decorative paint material different from said first decorative paint material over a second portion of the hook so that the fish hook lure has at least two coatings with different and contrasting pigments adjacent one another to provide a hook of enhanced visual perception.

13. The method of claim 12 including the step of first encapsulating the entire hook with a primer to inhibit rusting of the hook.

14. The method of claim 12 including the step of spraying a third layer of decorative paint material on top of said second layer of decorative paint material to create the painted fish-hook lure with at least three layers of decorative material.

15. A painted fish-hook lure comprising a hook having a shape provided with a shank carrying an eye for attaching a line thereto and further carrying a bend with a pointed end for hooking a fish with the fish hook having substantially an outer surface for reflecting light of a first wavelength with the improvement comprising:

a first coating of a decorative paint material located on a first region of the fish hook, said first coating of decorative paint material conforming to the outer surface of the fish hook without adding bulk to the hook, said first coating of decorative paint material maintaining the shape of the fish hook, said first coating of decorative paint material reflecting light of a wavelength different from the reflected light of the outer surface of the pointed end of the fish hook; and a second coating of a decorative paint material located on and covering at least a portion of the first region of the fish hook, said second coating of decorative paint material conforming to the outer surface of the fish hook without adding bulk to the hook, said second coating maintaining the shape of the fish hook, said second coating of decorative paint material reflecting light of a wavelength different from the reflected light of the outer surface of the pointed end of the fish hook to provide the shank of the hook with greater visual attractiveness than the point of the hook.

* * * * *